United States Patent [19]

Dyer

[11] 4,334,607
[45] Jun. 15, 1982

[54] LOAD-ENTRY ASSEMBLY FOR CONVEYOR SYSTEMS

[75] Inventor: Thomas A. Dyer, Greenwood, Ind.

[73] Assignee: Pentak Corporation, Indianapolis, Ind.

[21] Appl. No.: 189,130

[22] Filed: Sep. 22, 1980

[51] Int. Cl.$^3$ .................... B65G 25/00; B65G 37/00
[52] U.S. Cl. .................................... 198/487; 198/739
[58] Field of Search ............... 198/238, 239, 598, 487, 198/485, 372, 774; 193/35 A

[56] References Cited

U.S. PATENT DOCUMENTS

| | | | |
|---|---|---|---|
| 1,937,194 | 11/1933 | Fisk | 198/598 |
| 3,243,059 | 3/1966 | Kalberkamp | 198/487 |
| 3,301,375 | 1/1967 | Schmermund | 198/487 |
| 3,375,941 | 4/1968 | Repper | 198/487 |
| 3,768,644 | 10/1973 | DiFrank | 198/372 |
| 4,102,449 | 7/1978 | Shufran | 198/774 |
| 4,109,781 | 8/1978 | Moons | 198/485 |
| 4,219,115 | 8/1980 | Moore | 193/35 A |

FOREIGN PATENT DOCUMENTS

| | | | |
|---|---|---|---|
| 699647 | 8/1964 | Canada | 198/487 |
| 1247215 | 8/1967 | Fed. Rep. of Germany | 198/487 |

*Primary Examiner*—Bruce H. Stoner, Jr.
*Assistant Examiner*—Brian Bond
*Attorney, Agent, or Firm*—Jenkins, Coffey, Hyland, Badger & Conard

[57] ABSTRACT

A load-entry assembly for a conveyor system includes a conveyor section having laterally spaced side frame members supporting a plurality of load-carrying rollers for rotation about transverse axes which are arranged in a common plane above the side frame members to transport a load in a longitudinal direction between a first end and a second end of the conveyor section. A pair of first elongated tracks is mounted longitudinally to opposed sides of the conveyor section, and each track includes a lower horizontal track section, an upper horizontal track section, and an inclined track section connecting the lower and upper horizontal track sections in angular relationship thereto. A pair of second elongated tracks is also mounted longitudinally to opposed sides of the conveyor section. A trolley is both vertically and horizontally movable along the track sections of the first tracks in a generally constant parallel relationship to the plane of the load-carrying roller between a first position below the plane of the load-carrying rollers to allow movement of the load over the trolley to a second position above the plane of the load-carrying rollers to engage and push the load. Guide members are coupled to the trolley and movable horizontally along the second tracks in response to a propelling unit. The coupling between the guide members and the trolley controllably allows the entire trolley to move vertically relative to the guide members between two different planes to maintain its constant relationship to the plane of the load-carrying rollers.

18 Claims, 4 Drawing Figures

FIG. 1

LOAD-ENTRY ASSEMBLY FOR CONVEYOR SYSTEMS

The present invention relates generally to roller conveyor systems for transporting loads in a longitudinal direction between an upstream end and a downstream end which have associated therewith a device designed for entering the loads into the stream of the conveyor systems at a particular location. More particularly, the present invention relates to improvements in a load-entry device for such roller conveyor systems.

In general, a live conveyor system is defined as a conveyor having a driving unit for propelling an endless conveying means which, through frictional contact with either a plurality of load-carrying rollers or the load, transports the load from an upstream end to a downstream end of the conveyor system without the assistance of gravity. A non-live conveyor system can be defined as a conveyor having a plurality of load-carrying rollers for transporting the load from an upstream end to a downstream end of the conveyor system without the assistance of a driving unit to propel the load.

Furthermore, an accumulating live conveyor system includes means specifically designed to permit loads to remain stationary on the conveyor system in particular zones without stopping or interferring with the operation of the driving unit or endless conveying means. Accordingly, with an accumulating live conveyor system, loads can be stopped and accumulated in a particular zone of the conveyor. A non-accumulating live conveyor system propels the load from an upstream end to a downstream end of the conveyor system without the capability of stopping the load in particular zones of the conveyor. Therefore, in a non-accumulating live conveyor system, the operation of the driving unit or endless conveying means must be stopped in order to permit loads to remain stationary on the conveyor.

Load-pusher or load-entry devices, as they are sometimes called, are generally well known to those skilled in the art. These devices are generally used to enter loads into the stream of a conveyor system from either a lift truck or another intersecting conveyor system. Most of the time it is desirable that these load-entry devices be accumulating in order to permit a load to remain stationary in proximity to the conveyor system so that at the appropriate moment it can be pushed onto the conveyor system. However, it is not necessary for the load-entry device to be accumulating, and in some cases there may be a need for either a non-accumulating live load-entry device or a non-live load-entry device.

A conventional load-entry device for a conveyor system usually includes laterally spaced side frame members supporting a plurality of load-carrying rollers for rotation about transverse axes which are arranged in a common horizontal plane above the side frame members to transport a load in a longitudinal direction, a movable trolley including a head in parallel relationship to the transverse axes of the load-carrying rollers for engaging the load to push the load off the load-carrying rollers onto the conveyor system and one or more carriages for supporting the head, and means for propelling the trolley in the longitudinal direction of the device. The trolley will typically have a first position wherein the head is located below the plane of the load-carrying rollers to allow the load to pass over the trolley on the load-carrying rollers and a second position wherein the head is above the plane of the load-carrying rollers to engage the load and push it off the load-carrying rollers in response to the propelling means.

Many of these conventional load-entry devices do not push the loads completely clear of the load-carrying rollers when the load is pushed onto a conveyor system because the trolley head is not sufficiently projectable beyond the edge of the load-entry device. Furthermore, the lifting and longitudinal movement of the trolley from its first position to its second position and vice versa is insufficiently controlled, thereby resulting in irregular and rough operation in the vertical movement of the trolley.

It is therefore one object of the present invention to provide a load-entry assembly which is adaptable for use in conjunction with either non-live, live accumulating, or live non-accumulating conveyor systems which includes improved means for lifting and guiding the trolley to produce a smoother operation and allow greater projection of the trolley head to completely push the load off the load-entry assembly onto the conveyor system. Dual trolley heads are provided for increased strength and stability and a take-up adjustment for the means for propelling the trolley is located on the means for lifting and guiding the trolley for easy access and service.

According to the present invention, a load-entry assembly for a conveyor system includes a conveyor section having laterally spaced side frame members supporting a plurality of load-carrying rollers for rotation about transverse axes which are arranged in a common plane to transport a load in a longitudinal direction between a first end and a second end of the conveyor section, a trolley movable in the longitudinal direction of the conveyor section having dual heads for engaging and pushing the load off the second end of the conveyor section onto the conveyor system, means for lifting and guiding the trolley from a first position wherein the trolley heads are below the common plane of the load-carrying rollers to allow movement of the load over the trolley to a second position wherein the heads are above the common plane of the load-carrying rollers to engage and push the load, first tracks mounted to the side frame members for carrying the trolley, second tracks mounted to the side frame members for carrying the lifting and guiding means independent from the trolley, means for coupling the trolley to the lifting and guiding means to provide level vertical movement of the entire trolley relative to the lifting and guiding means in a generally constant parallel relationship to the plane of the load-carrying rollers, and means for propelling the lifting and guiding means to both vertically and horizontally move the trolley from its first position to its second position and vice versa in the longitudinal direction of the conveyor section.

In one illustrative embodiment, the first tracks include a lower track section in a first horizontal plane, an upper track section in a second horizontal plane, and an inclined track section angularly connecting the lower and upper track sections for raising and lowering the trolley in response to movement of the lifting and guiding means. The trolley includes carriages supporting the heads, each carriage has at least one roller for engaging the first track and the lifting and guiding means includes guide bars for engaging the second tracks and lift guide plates. The coupling between the trolley and the lifting and guiding means includes elongated angular slots formed in the lift guide plates and posts cantilevered from the carriages transverse to the longitudinal direction of the conveyor section for slidably engaging the slots in the lift guide plates.

Further according to the present invention, third tracks are mounted to the side frame members in proximity to one end of the lower track sections of the first tracks and in angular relationship thereto for controlling the raising and lowering of the trolley in response to horizontal movement of the lifting and guiding means. Each of the trolley carriages includes a second roller for engaging the third tracks.

In one illustrative embodiment, the inclined track sections of the first tracks and the third tracks are acutely angled in generally the same direction relative to the lower track sections of the first tracks and the elongated slots formed in the lift guide plates are obtusely angled in an opposed direction relative to the lower track sections of the first tracks. The angle between the inclined track sections and the lower track sections of the first tracks is generally greater than the angle between the third tracks and the lower track sections of the first tracks. The angle between the elongated slots in the lift guide plates and the lower track sections of the first tracks is generally less than either one of the angles between the inclined track sections or the third tracks relative to the lower track sections of the first tracks. Accordingly, while the lifting and guiding means is moved longitudinally along the second tracks in a single plane, the inclined track sections of the first tracks, the third tracks, and the elongated slots in the lift guide plates in combination, lift and guide the trolley from its first position to its second position and vice versa in a generally constant parallel relationship to the plane of the load-carrying rollers.

In one illustrative embodiment, the trolley includes dual heads for added strength and stability. The improved vertical movement of the trolley between its first and second positions allows loads to be pushed further beyond the end of the load-entry assembly onto an adjacent conveyor system than conventional load-entry assemblies without necessitating an increase in the overall length of the carriages supporting the heads.

Various other features and advantages of the present invention will become apparent in view of the following detailed description of an embodiment thereof, which description should be considered in conjunction with the drawings, in which:

Figure 1:
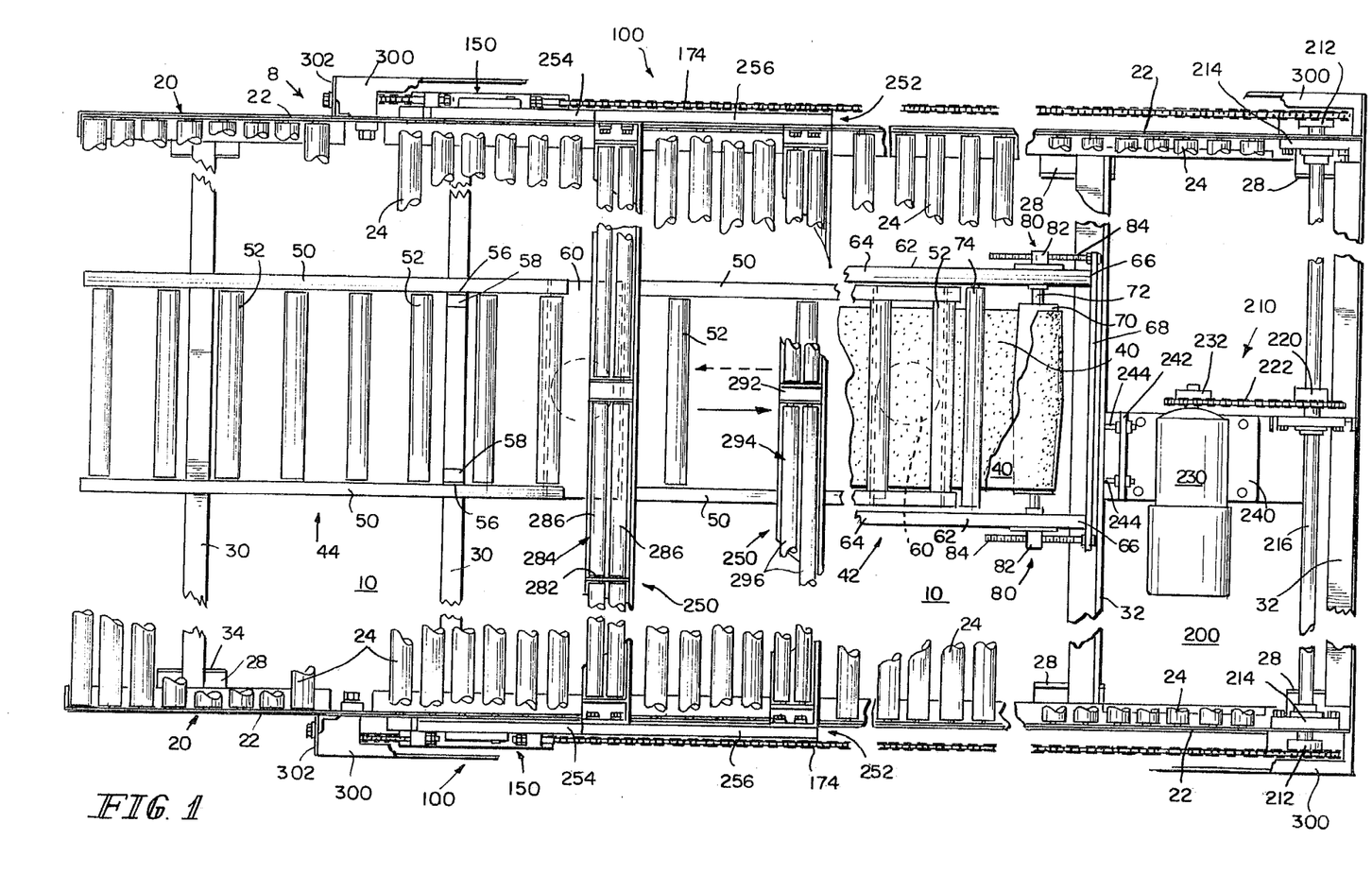
FIG. 1 is a top elevational view, partly broken away, of a load-entry assembly according to the present invention.
Figures 2, 3, 4:
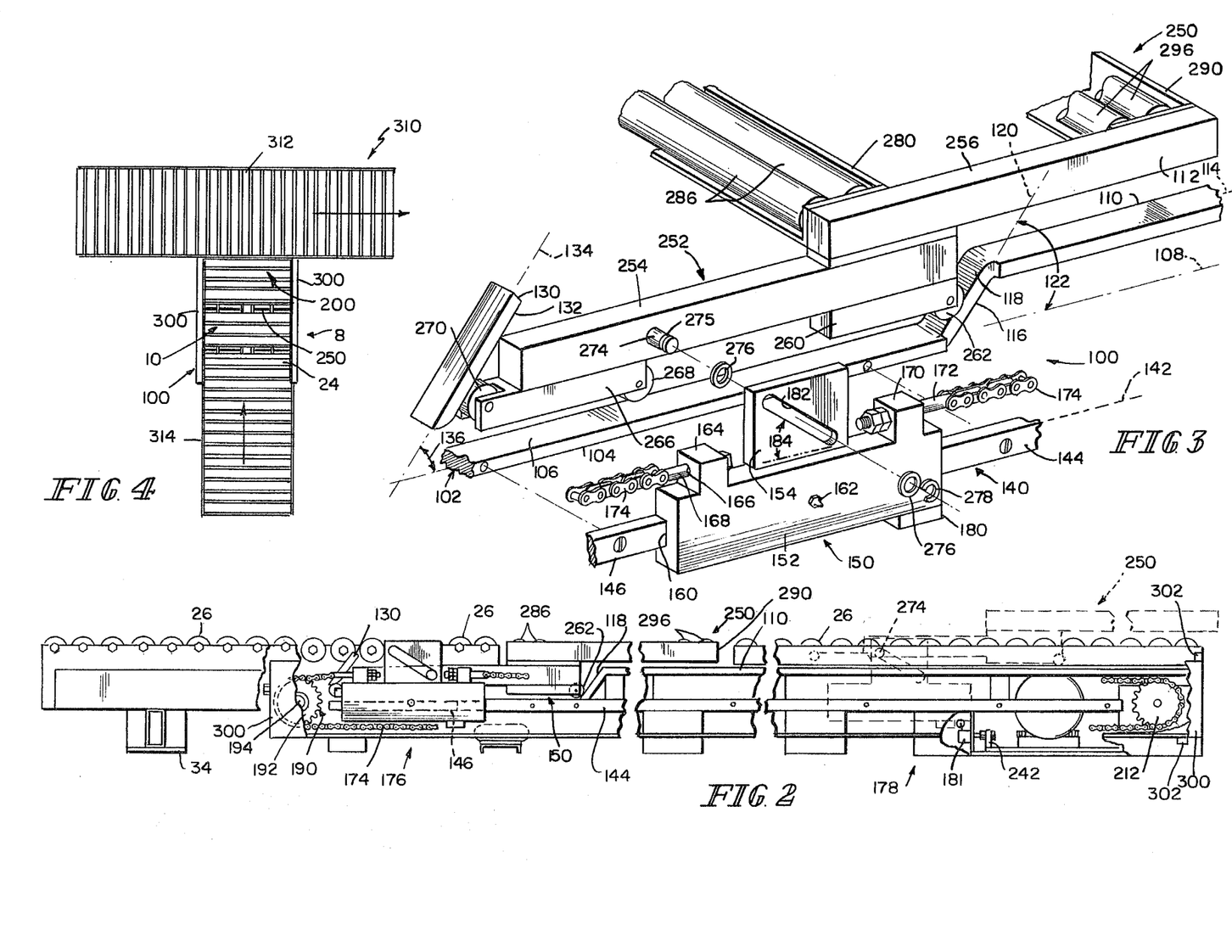
FIG. 2 is a side elevational view, partly broken away, of the assembly of FIG. 1.
FIG. 3 is an exploded sectional view, partly broken away, of the assembly shown in FIGS. 1 and 2.
FIG. 4 is a diagrammatic representation of a section of one embodiment of a conveyor system including the assembly shown in FIGS. 1-3.

Referring to FIGS. 1 and 2, there is shown a load-entry assembly 8 for pushing loads or articles (not shown) in a longitudinal direction, as represented by the solid vertical arrow in FIG. 1, onto an elongated conveyor system (see FIG. 4). The conveyor system can be either power-operated (live conveyor system) or operated with the assistance of gravity (non-live conveyor system) to transport the loads or articles (not shown) in a direction which is perpendicular to the longitudinal direction of the load-entry assembly 8, as can best be seen in FIG. 4. As will be explained in more detail later, a conveyor section 10 of the load-entry assembly 8 may also be either operated with the assistance of gravity, power-operated and accumulating or power-operated and non-accumulating. In the illustrative embodiment shown in FIGS. 1 and 2, the conveyor section 10 of load-entry assembly 8 is power-operated and accumulating. However, it should be understood that the present invention is not intended to be limited to a power-operated and accumulating conveyor section 10.

The load-entry assembly 8 is a single integrated unit including a conveyor section 10 which can be connected to other conveyor sections of an intersecting live conveyor system, as best shown in FIG. 4, and which may include means for accumulating loads on the conveyor section 10 without interference with the operation of the driving unit of the intersecting live conveyor system.

Continuing to refer to FIGS. 1 and 2, the conveyor section 10 of the load-entry assembly 8 shown in the figures is an accumulating live roller-conveyor section which in general may be constructed in one of the many ways well known in the conveyor art so that it may be adapted to other conveyor sections of an accumulating live roller conveyor system. The conveyor section 10 includes a side frame assembly 20 which for illustrative purposes is generally the same side frame assembly disclosed in a co-pending application entitled "SIDE FRAME ASSEMBLY FOR ROLLER CONVEYOR SYSTEMS," Ser. No. 135,279, filed Mar. 31, 1980, and assigned to the same assignee as the present invention.

The side frame assembly 20 of the conveyor section 10 includes two lateral side support members 22 provided in spaced parallel relationship to support a plurality of load-carrying rollers 24 for rotation about the transverse axes which are suitably spaced apart and arranged in a common load-transporting plane in the longitudinal direction of the conveyor section 10, as indicated by the solid vertical arrow in FIG. 1. As best illustrated in FIG. 2, the side support members 22 are rigid profiled upright rails having generally L-shaped cross section. The top or load-supporting surfaces 26 of the rollers 24 are supported in a common horizontal plane above the upper edge of the support members 22 to facilitate movement of loads on and off the conveyor section 10.

The two parallel side support members 22 of the conveyor section 10 are elevated in spaced relationship to the base or floor surface to which the assembly 10 and conveyor system (FIG. 4) are attached by leg angles 28, that is, legs having a J-shaped cross section and elongated spaced parallel tie members 30, 32. The tie members 30 are hollow and rectangular in cross section, as best illustrated in FIG. 2, and may be turned on either of their sides to support the side support members 22 in spaced relationship to the base or floor surface. The tie members 32 are generally L-shaped in cross section and are typically employed at the ends of the conveyor section 10. The leg angles 28 are connected by the tie members 30, 32 to fix the two side support members 22 in a predetermined spaced parallel relationship determined by the length of the load-carrying rollers 24. As can best be seen in FIG. 2, when the tie members 30, 32 are secured to the leg angles 28, they are also elevated in spaced relationship to the base or floor surface by upturned lip portions 34 of the leg angles 28.

When connected to other conveyor sections at one end of a live roller-conveyor system in the manner shown in FIG. 4, at least a portion of the conveyor section 10 is power-driven by an endless conveying means 40 which is held against at least some of the load-carrying rollers 24 to propel the rollers through friction contact therewith. Accordingly, at least some of the rollers 24 are power-driven to transport the loads or articles from an upstream end to a downstream end of the conveyor section 10 where they are pushed off of the conveyor section 10 and onto an intersecting conveyor system by the load-entry assembly 8. Illustratively, the endless conveying means 40 is a flexible belt formed of suitable material so as to develop frictional contact with the peripheral surfaces of those load-carrying rollers 24 directly above the conveying means 40. It should be noted that the endless conveying means 40 could also be a rope, chain, etc., which is formed of a material similar to that of the belt described above.

The endless conveying means 40 has an upper power-delivering or frictional-contact pass arranged for frictional driving contact with those load-carrying rollers 24 located directly above the conveying means 40 and a lower return or idle pass. In live roller-conveyor systems, the endless conveying means 40 is powered by suitable driving means which is located within a drive zone (not shown) of the complete conveyor system. This drive zone is typically located at the end of the complete conveyor system opposed to the end including the load-entry assembly 8.

In the illustrative embodiment, the conveyor section 10 of the load-entry assembly 8 includes an accumulating take-up assembly 42 for adjusting the tension of the endless conveying means 40 and an accumulating intermediate assembly 44. The assemblies 42, 44 each have the same general construction as take-up assembly sections and intermediate assembly sections, respectively, disclosed in a co-pending application entitled "DRIVE/TAKE-UP ASSEMBLY FOR ACCUMULATING LIVE ROLLER CONVEYOR SYSTEMS," Ser. No. 144,236, filed Apr. 28, 1980, which is assigned to the same assignee as the present application.

Each of the assemblies 42, 44 includes two elongated lateral inner side support channels 50 which are generally C-shaped in cross section and positioned in spaced parallel relationship to each other between the two outer side support members 22. Formed in each inner side support channel 50 are elongated slots (not shown) extending vertically in relation to the plane of the load-carrying rollers 24. These elongated slots in the inner side support channels 50 allow the inner side support channels 50 to be moved vertically relative to the plane of the load-carrying rollers 24.

The inner side support channels 50 rotatably support a plurality of pressure rollers 52 which are rotatable about transverse axes located below and in parallel relationship to the transverse axes of the load-carrying rollers 24. The pressure rollers 52 include upper surfaces which carry the upper frictional driving or contact pass of the endless conveying means 40. In the driving position of the conveyor section 20, the upper frictional contact pass of the endless conveying means 40 is captured between the pressure rollers 52 and the load-carrying rollers 24 to effect rotation of the load-carrying rollers 24 and propel loads or articles over the conveyor section 10 in the longitudinal direction, as represented by the solid vertical arrow in FIG. 1. The inner side support channels 50 may also support idler rollers (not shown) below the pressure rollers 52 to carry the lower return or idle pass of the endless conveying means 40. It should be noted that the inner side support channels 50 should have a combined length which is generally less than the length of the outer side support members 22 of the conveyor section 10 so that they do not interfere with the operation of adjoining sections of a complete conveyor system to which the load-entry assembly 8 may be connected.

The inner side support channels 50 are mounted within the conveyor section 20 by accumulator mounting brackets 56 which are generally L-shaped in cross section. Each mounting bracket 56 includes an inwardly and transversely extending flange 58 which is secured to a tie member 30 by screws, welding, or other conventional means. Formed in the mounting brackets 56 are slots (not shown) which extend longitudinally in the direction of the conveyor section 10 and which are therefore parallel relative to the plane of the load-carrying rollers 24 and the pressure rollers 52. The inner side support channels 50 are loosely connected to the mounting brackets 56 to allow upward, downward, and pivotal movement of the inner side support channels 50 relative to the brackets 56. Accordingly, the mounting brackets 56 provide fulcrums for the raising and lowering of the ends of the inner side support channels 50 by independently operable jack means 60 positioned at the ends of the inner side support channels 50 to simultaneously raise and lower the corresponding ends of the inner side support channels 50. By raising and lowering the inner side support channels 50, the pressure rollers 52 carrying the upper frictional contact pass of the endless conveying means 40 are correspondingly raised and lowered to engage and disengage, respectively, the endless conveying means 40 and those load-carrying rollers 24 positioned directly above the endless conveying means 40 to selectively transport and accumulate loads, respectively, on the conveyor section 10.

It should also be understood that the load-entry assembly 8 of the present invention can include a non-live conveyor section, that is, a conveyor section which does have load-carrying rollers 24 arranged to transport a load from an upstream end of the conveyor section to a downstream end of the conveyor section, but which does not have a driving unit, endless conveying means 40, or accumulating assemblies 40, 42 for propelling the rollers 24. In a non-live conveyor section, loads are transported over the load-carrying rollers with the assistance of gravity.

As shown in FIG. 1, the live conveyor section 10 of the load-entry assembly 8 includes an accumulating take-up assembly 42 forming the downstream end or take-up zone of a complete live conveyor system. Since the conveyor section 10 of the load-entry assembly 8 can accommodate an accumulating take-up assembly 42, the load-entry assembly 8 may be employed as the downstream end of a complete conveyor system so that loads which are transported over the conveyor system may be pushed off of the downstream end of the conveyor system onto an intersecting conveyor system (see FIG. 4). With the accumulating feature of the take-up assembly 42, loads can be accumulated at the downstream end of the adjoining conveyor system before they are pushed onto the intersecting conveyor system.

The accumulating take-up assembly 42 includes take-up assembly inner frame members 62 which are positioned outside the inner side support channels 50. The take-up assembly inner frame members 62 have stationary ends 64 which are pivotally connected to a cross-tie member 30 and movable ends 66 so that while the ends 64 remain stationary relative to the plane of the load-carrying rollers 24, the ends 66 are movable upward and downward. It can therefore be appreciated that the connection of the assembly inner frame members 62 to the cross-tie member 30 serves as a fulcrum for the movement of the take-up assembly 42 relative to the plane of the load-carrying rollers 24.

Secured to the movable ends 66 of the assembly inner frame members 62 is an elongated end panel 68 which extends transversely beyond the assembly inner frame members 62 to provide a flange for movably coupling the ends 66 of the assembly inner frame members 62 to the end cross-tie member 32. The flanges (not shown) are connected to the end cross-tie member 32 so that the ends 66 of the assembly inner frame member 62 are biased downwardly against the end cross-tie member 32 by compression springs. It should be noted that the take-up assembly inner frame member 62 can be used in a non-accumulating mode of operation by removing the compression springs and inserting a series of washers between the flange and the end cross-tie member 32 to elevate the ends 66 of the assembly inner frame members 62 so that they are generally within the same plane as the stationary ends 64. Accordingly, the endless conveying means 50 would constantly engage the load-carrying rollers 24 directly above the assembly inner frame member 62 to continuously propel those load-carrying rollers 24.

In the accumulating mode of operation, the ends 66 of the assembly inner frame members 62 are raised and lowered into a driving position and an accumulating position, respectively. The assembly inner frame members 62 are initially biased downward and are moved upward in response to jack means 60 secured to the proximal ends of the inner side support channels 50 associated with the take-up assembly 42 and to the assembly inner frame members 62. Accordingly, extension of the jack means 60 causes a simultaneous rising of the proximal ends of the inner side support channels 50 and the ends 66 of the assembly inner frame members 62.

Continuing to refer to FIG. 1, rotatably mounted to the assembly inner frame members 62 in proximity to the movable ends 66 thereof is an adjustable tensioning roller 70 mounted to a shaft 72 for rotation therewith which engages the endless conveying means 40. Also included in the accumulating take-up assembly 42 and mounted for rotation to the assembly inner frame member 62 in proximity to the adjustable tensioning roller 70 is a drive control roller 74. The control roller 74 serves in the same capacity as the pressure rollers 52 supported by the inner side support channels 50, and in fact supports and carries the endless conveying means 40. The control roller 74 is simultaneously raised and lowered with the adjustable tensioning roller 70 in response to operation of the jack means 60.

Further included in the take-up assembly 42 is means 80 for adjusting the longitudinal position of the tensioning roller 70 to vary the tension in the endless conveying means 40. Formed in the assembly inner frame members 62 of the take-up assembly 42 in proximity to the end panels 68 are two elongated longitudinally extending slots (not shown). The ends of the tensioning roller 70 are rotatably mounted to tensioning roller carriages 82 which are slidably carried within the elongated slot so that the tensioning roller 70 may be longitudinally adjusted to increase or decrease the tension of the endless conveying means 40. Means for adjusting the longitudinal position of the tensioning roller 70 includes two elongated threaded bolts which are threadably coupled to the tensioning roller carriages 82 and which extend through the end panel 68. By turning the bolts 84 located on either side of the assembly inner frame member 62, the tensioning roller 70 can be adjusted in the longitudinal direction to adjust the tension of the endless conveying means 40.

Although not specifically shown, it should be noted that the load-entry assembly 8 can be constructed as a self-contained accumulating live roller conveyor section which includes an accumulating drive assembly for propelling the endless conveying means 40 and an accumulating take-up assembly 42, such as the one shown in FIG. 1 and described hereinabove. The accumulating drive assembly may be located in the upstream end of the conveyor section 10. One of the advantages of a completely self-contained load-entry assembly 8 which is live and accumulating is that loads can be automatically propelled from the upstream end of the conveyor section 10 to the downstream end, accumulated, and thereafter pushed off of the load-entry assembly 8 onto a conveyor system. It is therefore possible to employ the load-entry assembly 8 of the present invention without requiring adjacent conveyor sections of a complete conveyor system for the purpose of receiving loads from a transportation vehicle, such as a fork lift truck, and thereafter pushing them into the stream of an intersecting conveyor system.

Illustratively, an accumulating drive assembly which may be incorporated into the conveyor section 10 of the load-entry assembly 8 may be of the same general construction as the drive assembly disclosed in the previously referred to co-pending application entitled "DRIVE/TAKE-UP ASSEMBLY FOR ACCUMULATING LIVE ROLLER CONVEYOR SYSTEMS," Ser. No. 144,236, filed Apr. 28, 1980.

It should also be understood that the jack means 60 may be air-operated and are therefore connected to an air supply source so that the flow of air to each of the jack means 60 is independently controllable from a control means (not shown) to selectively raise and lower the inner side support channels 50 and the inner frame members 62 of the conveyor section 10.

Referring to FIGS. 1, 2, and 3, the load-entry assembly 8 further includes a mechanism 100 for lifting and guiding a trolley 250 from a load-carrying or first position wherein the trolley 250 is located below the common horizontal plane of the load-carrying rollers 24 to a load-pushing or second position wherein the trolley is located above the horizontal plane of the load-carrying rollers 24 to engage the load and push it off of the downstream end of the conveyor section 10 onto an intersecting conveyor system.

Mounted longitudinally to either side of the side frame assembly 20 in generally parallel relationship to the horizontal plane of the load-carrying rollers 24 are two tracks 102. Each of the tracks 102 includes a lower track section 104 mounted in proximity to the upstream end of the conveyor section 10. The lower track sections 104 include upper track surfaces 106 which are contained within a first horizontal plane 108 parallel to the horizontal plane of the load-carrying rollers 24. Each of the tracks 102 also includes an upper track section 110 extending longitudinally from the lower track section 104 to the downstream end of the conveyor section 10 in spaced parallel relationship to the lower track section 104. The upper track sections 110 include an upper track surface 112 contained within a second horizontal plane 114 also parallel to the horizontal plane of the load-carrying rollers 24. Importantly, the planes 108 and 114 are different and in spaced relationship to each other.

Intermediate inclined track sections 116 angularly connect the lower and upper track sections 104, 110 and include upper track surfaces 118 contained within inclined planes 120 which serve to guide vertical movement of the trolley 250 from the lower track sections 104 to the upper track sections 110. The acute angle 122 between the inclined planes 120 of the intermediate track sections 116 and the lower track sections 104 is approximately 55°. It should be understood that angle 122 could be generally less than or more than 55°, as long as it remains acute, without departing from the scope of the present invention.

Provided adjacent and in angular relationship to the end of the lower track sections 104 in proximity to the upstream end of the conveyor section 10 are inclined end tracks 130. Tracks 130 include lower track surfaces 132 contained within inclined planes 134 which form an acute angle 136 with the horizontal plane 108 of the lower track sections 104 of approximately 53°. It should be noted that the acute angle 122 between the intermediate track sections 116 and the lower track sections 104 can be generally 0°-5° greater than the acute angle 136 between the end tracks 130 and the lower track sections 104. It should therefore be understood that angle 136 could be generally less than or greater than 53°, as long as it remains acute and less than angle 122, without departing from the scope of the present invention. The reason for this difference in the angles 122, 136 is to provide control of the vertical movement of the trolley 250 so that it vertically moves in a generally constant relationship to the horizontal plane of the load-carrying rollers 24. A greater appreciation for this difference will be developed in the description of the operation of the lift and guide mechanism 100.

The load-entry assembly 8 further includes two additional elongated tracks 140 which are mounted adjacent the tracks 102 on both sides of the side frame assembly 20 and which extend longitudinally in single horizontal planes 142 which are generally the same horizontal planes 108 as the lower track sections 104 of the tracks 102. The tracks 140 are divided into a long track section 144 and a short track section 146, as best seen in FIG. 2. The short track sections 146 are easily removable for purposes of sliding the lift and guide mechanism 100 onto the tracks 140. Once the lift and guide mechanism 100 has been placed on the tracks 140, the short track sections 146 are placed in position to complete the tracks 140.

The lift and guide mechanism 100 includes two guide members 150 which are slidable along the tracks 140 to horizontally move and guide the trolley 250 in the longitudinal direction of the conveyor section 10 and also to control the vertical movement of the trolley 250 from its first position to its second position and vice versa. The guide members 150 each include a longitudinal movement guide bar 152 which slidably engages the tracks 140 and a lift guide plate 154 which is coupled to the trolley 250 to allow vertical movement of the entire trolley 250 relative to the guide member 150 in generally constant parallel relationship to the plane of the load-carrying rollers 24.

The movement guide bars 152 of the guide members 150 include a generally C-shaped longitudinal channel having flanges (not shown) for retaining the bars 152 on the tracks 140. Located intermediate the ends of the movement guide bars 152 is a grease fitting 162 for purposes of lubricating the contact surfaces between the guide bars 152 and the tracks 140. Extending upwardly from the guide bars 152 in proximity to one end thereof are first legs 164 which include apertures 166 for receiving first adjustable pins 168 which are generally provided in parallel relationship to the tracks 140. Also extending upwardly from the guide bars 152 in proximity to the other ends thereof are second legs 170 which also include apertures (not shown) for receiving second adjustable pins 172 which are also generally provided in parallel relationship to the tracks 140.

Connected to the adjustable pins 168, 172 are means 174 for horizontally propelling the guide members 150 from a rest position 176, as represented by the solid lines in FIG. 2, to a return position 178, as represented by the dotted lines in FIG. 2. In the illustrative embodiment, the propelling means 174 includes two link chains, each having its ends connected to one of the guide members 150 employing the adjustable pins 168, 172. The first and second adjustable pins 168, 172 for connecting the propelling means 174 to the guide members 150 provide means for adjusting the tension of the link chains 174 and also for adjusting the orientation of the trolley 250 relative to the load and load-carrying rollers 24.

Continuing to refer to FIG. 3, at least one of the guide bars 152 also includes a downwardly projecting leg 180 for engaging limit switches 181 which are mounted to the side frame assembly 20 to establish the rest position 176 and return position 178 of the guide members 150. When the downwardly projecting leg 180 of the guide members 150 engages the limit switch 181 in proximity to the downstream end of the conveyor section 10, the trolley 250 is automatically returned to its rest position 176. When the downwardly projecting leg 180 engages the limit switch 181 (not shown) in proximity to the upstream end of the conveyor section 10, the guide members 150 are stopped in their rest position 176.

As particularly shown in FIGS. 2 and 3, the lift guide plates 154 associated with the guide members 150 are located between the first and second upwardly extending legs 164, 170 of the guide bars 152. Each of the guide plates 154 includes an elongated angular slot 182 having a direction of inclination which is opposed to the direction of inclination of the intermediate track sections 116 of the tracks 102 and the end tracks 130. The acute angle of inclination 184 of the slots 182 relative to the planes 108, 114, 142 is approximately 35°. Illustratively, therefore, the angle formed by the inter-section of the plane 120 of the intermediate track sections 116 and the plane of the slots 182 is approximately 90°. It should be noted that angle 184 could be generally less than or greater than 35° without departing from the scope of the present invention; however, it is generally preferred that the sum of the angle 184 and the angle 122 approximate 90° for optimum efficiency of operation.

Associated with the propelling means 174 is an idler mechanism 190, which is best illustrated in FIG. 2. The idler mechanism 190 is located in proximity to the upstream end of the conveyor section 10 and adjacent the rest position 176 of the guide members 150. The idler mechanism 190 includes two independent sprocket wheels 192 rotatably supported on either side of the side frame assembly 20 by independent shafts 194. The sprocket wheels 192 each include a plurality of cogs for engaging the link chain of the propelling means 174.

Also associated with the propelling means 174 and located in proximity to the downstream end of the conveyor section 10 adjacent the take-up assembly 42 in a drive assembly compartment 200 of the conveyor section 10 is a drive mechanism 210 for driving the propelling means 174. The drive mechanism 210 includes two sprocket wheels 212 rotatably mounted to the side frame assembly 20 in proximity to the downstream end of the conveyor section 10 by mounting brackets 214. The sprocket wheels 212 are interconnected and rotatable on an elongated shaft 216 which spans the drive assembly compartment 200 of the conveyor section 10. Each of the sprocket wheels 212 includes a plurality of cogs for engaging the link chain of the propelling means 174. Accordingly, each of the sprocket wheels 212 are rotated simultaneously by the shaft 216 to propel the link chain 174 and the guide members 150.

Secured to the elongated shaft 216 intermediate the two lateral side support members 22 of the side frame assembly 20 is another sprocket wheel 220 which also includes a plurality of cogs for engaging another propelling means 222 or link chain which is driven by a suitable drive means 230 to rotate the elongated shaft 216 and thereby simultaneously move the guide members 150. The driving means 230 may include any conventional bi-directional motor. In the illustrative embodiment, the driving means 230 is a motor of the type manufactured by Eurodrive, Inc., of Troy, Ohio, and identified by Model No. R60DT90S4BH. Secured to the driving means 230 is another sprocket wheel 232 including a plurality of cogs for engaging the propelling means 222.

The driving means 230 is secured and supported within the drive assembly compartment 200 of the conveyor section 10 by a mounting platform 240. The mounting platform 240 includes an upturned flange 242 for receiving pins 244 which are also connected to the tie member 32 which supports the take-up assembly 42. By adjusting the pins 244, the mounting platform 240 is movable longitudinally to adjust the tension of the propelling means 222.

As can best be seen in FIG. 2, the limit switches 181 are provided in proximity to both the idler mechanism 190 and the drive mechanism 210 to engage the guide members 150 and provide a signal to the driving means 230 to indicate that the guide members 150 have reached their rest and return positions 176, 178. The limit switches 181 provided in proximity to the drive mechanism 210 provide a signal which reverses the direction of the driving means 230 to move the guide members 150 in the direction of the broken horizontal arrow, as viewed in FIG. 1.

Continuing to refer to FIGS. 1, 2, and 3, the trolley 250 is movably carried by the tracks 102 in the longitudinal directions represented by the solid and broken arrows in FIG. 1. The trolley 250 is vertically and horizontally movable from its first position corresponding generally to the rest position 176 of the guide members 150 to its second position corresponding generally to the automatic return position 178 of the guide members 150 and vice versa. The trolley 250 includes two carriages 252 which are movably supported on either side of the side frame assembly 20 by the tracks 102. The carriages 252 include a lower section 254 which extends toward the upstream end of the conveyor section 10 and an overlapping upper section 256 which extends in the direction of the downstream end of the conveyor section 10.

The lower sections 254 of the carriages 252 include a first roller-mounting bracket 260 for supporting a first downwardly projecting vertical roller 262 for engaging the tracks 102. The lower sections 254 also include a second roller-mounting bracket 266 which extends beyond one end of the lower section 254 for supporting a second downwardly projecting vertical roller 268 and an upwardly projecting vertical roller 270. As can best be seen in FIG. 3, the downwardly projecting vertical rollers 262, 268 engage the track 102 and the upwardly projecting vertical rollers 270 engage the end tracks 130. As will be explained in more detail later, these rollers 262, 268, and 270 assist the vertical movement of the trolley 250 from its first position to its second position and vice versa in response to movement of the guide members 150 so that the entire trolley 250 is continuously maintained in generally the same relationship to the plane of the load-carrying rollers 24 during both vertical and horizontal movement thereof.

Outwardly projecting and cantilevered from each of the lower sections 254 of the carriages 252 are posts 274 which slidably engage the slots 182 of the lift guide plates 154 of the guide members 150. Each of the posts 274 includes a circumferential groove 275 formed in proximity to their distal ends, and the posts 274 are maintained in proper relationship to the lift guide plates 154 by washers 276 and C-shaped retainers 278 which engage the grooves 275.

Continuing to refer to FIGS. 1 and 2, the trolley 250 further includes a first sectionalized L-shaped support bracket 280 which is mounted rearwardly on the upper sections 256 of the carriages 252. The support bracket 280 is sectionalized by partitions 282 which form sections 284 for supporting two load-carrying rollers 286 in tandem. The load-carrying rollers 286 have a reduced diameter as compared to the load-carrying rollers 24 so that when the trolley 250 is located in its first position, the support bracket 280 and load-carrying rollers 286 occupy a space equivalent to two of the load-carrying rollers 24. The load-carrying rollers 286 have load-carrying surfaces which project above the support bracket 280 so that when the trolley 250 is located in its first or load-carrying position, the support bracket is below the plane of the load-carrying rollers 24 so that loads can be passed over the trolley 250 without interference.

The trolley 250 also includes a second sectionalized L-shaped support bracket 290 which is mounted forwardly to the other ends of the upper sections 256 of the carriages 252 to provide a contact head for engaging loads located on the downstream end of the conveyor section 10. The support bracket 290 is also sectionalized by partitions 292 forming sections 294 for supporting two load-carrying rollers 296 in tandem. The load-carrying rollers 296 also include load-carrying surfaces which are above the support bracket 290 for supporting the load when the trolley 250 is in its first or load-carrying position. The arrangement of two support brackets 280, 290 comprising the complete pusher head of the trolley 250 provides greater strength and stability to the trolley 250 when pushing the load off of the downstream end of the conveyor section 10. Because the trolley 250 is maintained in constant relationship to the plane of the load-carrying rollers 24 and is not tilted during vertical movement between its first and second positions, the carriages 252 have been uniquely designed to allow the leading support bracket 290 to be projected approximately one foot beyond the edge of the downstream end of the conveyor section 10 so that loads are pushed completely off of the conveyor section 10 onto an intersecting conveyor system. Importantly, this significant advantage is achieved without increasing the overall length of the trolley 250 in comparison to conventional load-pusher assemblies. It should also be understood that further projection of the leading support bracket 290 is possible without significantly increasing the overall length of the trolley 250.

Cover panels 300 are supported outside the side frame assembly 20 to cover the lift and guide mechanism 100 of the load-entry assembly 8. The panels 300 protect the mechanism 100 and limit access thereto without the removal of the cover panels 300 to prevent injury. The cover panels 300 are supported in spaced relationship to the side frame assembly 20 by mounting brackets 302 so that the panels 300 are easily removable to allow access to the lift and guide mechanism 100 for repair or servicing.

Having described the details of the load-entry assembly 8, FIG. 4 illustrates one embodiment of a roller conveyor system 310 employing the load-entry assembly 8 of the present invention. In the illustrative embodiment shown in FIG. 4, the conveyor system 310 includes a first conveyor 312 for conveying loads in a longitudinal direction as indicated by the horizontal arrow in FIG. 4, and a second conveyor 314 intersecting the first conveyor 312 for transporting loads in a longitudinal direction as indicated by the vertical arrow. Located at the downstream end of the second conveyor 314 adjacent the intersecting first conveyor 312 is a load-entry assembly 8 constructed according to the present invention. It will be understood that this embodiment is only intended to be illustrative, and that various other combinations of conveyor systems may be constructed using the load-entry assembly 8. For example, it would be possible to utilize the load-entry assembly 8 of the present invention without the second conveyor 314 in a manner previously described. In FIG. 4, similar parts of the load-entry assembly 8 shown diagrammatically are identified by the same reference numerals corresponding to such parts in FIGS. 1–3.

The operation of the load-entry assembly 8 can best be described by referring to FIGS. 1–4 in combination. A load which has either been placed on the upstream end of the load-entry assembly 8 by a lift truck or has been transported onto the conveyor section 10 of the load-entry assembly 8 from a conveyor system 314 is transported over the trolley 250 on the load-carrying rollers 20 when it is located in its first or load-carrying position by either a drive unit or with the assistance of gravity. This can best be seen by referring to FIG. 2. Once the load has been transported past the trolley 250 and is accumulated on the downstream end of the conveyor section 10 of the load-entry assembly 8, the load triggers a signalling device for the driving means 230 which initiates the propelling means 174. It will be understood that in a live assembly the accumulation of the load on the downstream end of the conveyor section 10 is accomplished due to the accumulation features of the take-up assembly 42 and the fact that the load-carrying rollers 24 positioned over the drive assembly compartment 200 of the conveyor section 10 are not power-driven. Of course, in a non-live conveyor system, accumulation of the loads on the downstream end of the conveyor section 10 would be accomplished by removing the force being applied to the load for movement over the load-carrying rollers 24.

When the propelling means 174 is initiated by the driving means 230, the guide members 150 are horizontally moved from their rest position 176 toward the downstream end of the conveyor section 10. When the guide members 150 are initially moved, the rollers 262 associated with the carriages 252 of the trolley 250 engage the intermediate inclined track sections 116 of the tracks 102 which oppose horizontal movement of the trolley 250 in the longitudinal direction of the conveyor section 10. As the guide members 150 continue to move horizontally in the longitudinally direction, the posts 274 start to slide upwardly in the slots 182 in the lift guide plates 154 in response to opposition to the horizontal movement by the inclined track sections 116. Simultaneously, the rollers 270 of the carriages 252 engage the end tracks 130. The difference in the angles 122 and 136 prevents the carriages 252 from tilting forward during vertical movement. The continued horizontal movement of the guide members 150 in combination with the inclination of intermediate track sections 116, the inclination of the end track sections 130, and the opposed inclination of the slots 182 lift the trolley from its first or load-carrying position, as shown in FIG. 2 by the solid lines, to its second or load-pushing position as indicated by the broken lines in FIG. 2 while maintaining a generally constant relationship with the plane of the load-carrying rollers 24. As the guide members 150 continue to move horizontally in a longitudinal direction along the tracks 140, the trolley 250 is moved toward the downstream end of the conveyor section 10 to engage the load accumulated thereon and push the load off of the load-entry assembly 8 onto the intersecting conveyor 312, as shown in FIG. 4.

The limit switches 181 have been strategically positioned so that when the head of the trolley 250 is extended well beyond the edge of the conveyor section 10, a signal is provided to the driving means 230 to reverse its direction so that the guide members 150 are moved in the longitudinal direction toward the upstream end of the conveyor section 10, as indicated by the broken arrow in FIG. 1. When the guide members 150 are in proximity to their rest position 176, the roller 270 engages the end tracks 130 and the trolley 250 is gradually lowered into its first or load-carrying position by the rollers 262, the intermediate inclined track sections 116, and the opposed inclined slots 182 of the lift guide plates 154. The trolley 250 remains in its first or load-carrying position until a further load is transported over the load-carrying rollers 24 and accumulated in proximity to the downstream end of the conveyor section 10, whereupon another signal is provided to the driving means 230 and the operation of pushing the load off of the load-entry assembly 8 onto an intersecting conveyor system 312 is repeated.

As can be appreciated from the description of the operation of the load-entry assembly 8, the lift and guide mechanism 100 has been designed to improve the lifting and lowering operation of the trolley 250 from its first position to its second position and vice versa so that the trolley moves vertically in constant relationship to the load-carrying rollers 24. This significant feature allows the trolley 250 to push the load further beyond the edge of the conveyor section 10 than conventional systems without significantly increasing the overall length of the trolley 250 to assure that the load has cleared the load-entry assembly 8. These features in combination with the means for adjusting the tension of the propelling means 174 and the orientation of the trolley 250 relative to the load provide a load-entry assembly 8 having an improved operation for pushing and entering loads into the stream of a conveyor system.

Further, the load-entry assembly 8 has been compactly designed so that the lift and guide mechanism 100 can be connected to the side frame assembly 20 of a conveyor section 10 having a standard conveyor section width of 84 inches, and the load-entry assembly 8 can be shipped in a standard 90-inch wide truck bed. Conventional load-entry assemblies have required a reduction in the width of the conveyor section 10 in order that they could be shipped in standard 90-inch equipment.

What is claimed is:

1. A load-entry assembly for a conveyor system, comprising a conveyor section including laterally spaced side frame members supporting a plurality of load-carrying rollers for rotation about transverse axes which are arranged in a common plane to transport a load in a longitudinal direction between a first end and a second end of the conveyor section, a trolley movable in the longitudinal direction of the conveyor section including a head for engaging and pushing the load off the second end of the conveyor section onto the conveyor system, means for lifting and guiding the trolley from a first position wherein the trolley head is below the common plane of the load-carrying rollers to allow transportion of the load over the trolley to a second position wherein the head is above the common plane of the load-carrying rollers to engage and push the load, first tracks mounted to the side frame members for carrying the trolley, second tracks mounted to the side frame members for carrying the lifting and guiding means, means for coupling the trolley to the lifting and guiding means to provide level vertical movement of the entire trolley relative to the lifting and guiding means in a generally constant parallel relationship to the plane of the load-carrying rollers, and means for propelling the lifting and guiding means to both vertically and horizontally move the trolley from its first position to its second position and vice versa in the longitudinal direction of the conveyor section.

2. The assembly as recited in claim 1 wherein the first tracks include a lower track section in a first plane, an upper track section in a second plane, and an inclined track section angularly connecting the lower and upper track sections for vertically raising and lowering the trolley in response to horizontal movement of the lifting and guiding means.

3. The assembly as recited in claim 2 wherein the trolley further includes carriages for supporting the head, the carriages each including at least one downwardly projecting vertical roller for engaging the first tracks.

4. The assembly as recited in claim 3 wherein the lifting and guiding means includes guide members for controlling the vertical and horizontal movement of the trolley in response to the propelling means, each guide member including a guide bar for slidably engaging the second tracks and a lift guide plate.

5. The assembly as recited in claim 4 wherein the coupling means between the trolley and the lifting and guiding means includes elongated angular slots formed in the lift guide plates of the guide members and post cantilevered from the carriages transverse to the longitudinal direction of the conveyor section for slidably engaging the slots in the lift guide plates.

6. The assembly as recited in claim 5 wherein the angular relationship of the slots to the first tracks is opposed to the angular relationship of the inclined track sections of the first tracks.

7. The assembly as recited in claim 6 wherein, in combination, the angle between the slots and the lower track sections of the first track and the angle between the inclined track sections and the lower track sections of the first track is generally equal to 90°.

8. The assembly as recited in claim 6 further comprising third tracks mounted to the side frame members in proximity to one of the ends of the lower track sections of the first tracks for controlling the vertical raising and lowering of the trolley in response to horizontal movement of the lifting and guiding means.

9. The assembly as recited in claim 8 wherein the third tracks are mounted in angular relationship to the lower track sections of the first tracks in generally the same angular relationship as the inclined track sections of the first tracks to the lower track sections thereof.

10. The assembly as recited in claim 9 wherein the angle between the third tracks and the lower track sections of the first tracks is generally less than the angle between the inclined track sections and the lower track sections of the first tracks.

11. The assembly as recited in claim 9 wherein the carriages further include at least one upwardly projecting vertical roller for engaging the third tracks.

12. The assembly as recited in claim 1, further comprising means for connecting the guide member to the propelling means, the connecting means including means for adjusting the orientation of the head relative to the load and means for adjusting the tension of the propelling means.

13. The assembly as recited in claim 12, wherein the trolley includes two heads, a first head for engaging the load and a second head in spaced parallel relationship to the first head for stabilizing and strengthening the first head.

14. The assembly as recited in claim 13, wherein each of the heads includes at least one load-carrying roller for rotation about a transverse axis which is arranged to be positioned in the common plane of load-carrying rollers of the conveyor section when the trolley is in its first position to transport the load over the trolley heads in the longitudinal direction of the conveyor section.

15. In a load-entry assembly for a conveyor system wherein the assembly includes laterally spaced side frame members supporting a plurality of load-carrying rollers for rotation about transverse axes which are arranged in a common horizontal plane to transport a load in a longitudinal direction, a movable trolley including a head for engaging the load to push the load off the load-carrying rollers onto the conveyor system and a carriage for supporting the head, the trolley having a load-carrying position wherein the head is below the plane of the load-carrying rollers to allow the load to pass over the trolley on the load-carrying rollers and a load-pushing position wherein the head is above the plane of the load-conveyor rollers to engage the load, and means for propelling the trolley in the longitudinal direction of the assembly, the improvement comprising a first track mounted to the side frame members for tracking vertical and horizontal movement of the trolley, means for lifting and guiding the trolley from its load-carrying position to its load-pushing position and vice versa which is movable horizontally in response to the propelling means, means for coupling the trolley to the lifting and guiding means to control vertical movement of the trolley in a generally constant relationship to the plane of the load-carrying rollers in response to the horizontal movement of the lifting and guiding means, a second track mounted to the side frame members for tracking the horizontal movement of the lifting and guiding means separate from the trolley and means for connecting the lifting and guiding means to the propelling means including means for adjusting the tension of the propelling means.

16. A mechanism for moving a trolley of a load-entry conveyor assembly from a first position for allowing loads to be transported in a longitudinal direction over the trolley to a second position for engaging and pushing the load off of the conveyor assembly comprising at least one multi-level track for vertically and horizontally carrying the trolley, means movable horizontally for lifting and guiding the trolley from its first position to its second position along the first track, at least one unilevel track for horizontally carrying the lifting and guiding means independent from the trolley, means for coupling the trolley to the lifting and guiding means to control vertical and horizontal movement of the trolley from its first position to its second position and vice versa in a generally constant relationship to the conveyor assembly in response to horizontal movement of the lifting and guiding means, and means for propelling the lifting and guiding means in a single horizontal plane from one end of the unilevel track to the other end and vice versa to provide horizontal and level vertical movement of the trolley between its first and second positions.

17. In a load-entry assembly for a conveyor system including laterally spaced side frame members supporting a plurality of load-carrying rollers in a common plane to transport a load in a longitudinal direction, and a trolley for pushing the load off the load-carrying rollers at one end of the assembly, a mechanism for moving the trolley from a first plane below the plane of the load-carrying rollers to a second plane above the load-carrying rollers and vice versa, the mechanism including at least one multi-level track having track surfaces in at least two different planes for horizontally carrying the trolley in its first and second planes, and means movable horizontally in a single plane for vertically moving the trolley between its first and second planes in generally constant spaced parallel relationship thereto and for horizontally moving the trolley in its two planes.

18. A load-entry assembly for a conveyor system, comprising a conveyor section including laterally spaced side frame members supporting a plurality of load-carrying rollers for rotation about transverse axes which are arranged in a common horizontal plane above the side frame members to transport a load in a longitudinal direction between a first end and a second end of the conveyor section, a first pair of elongated tracks mounted to opposed sides of the conveyor section, the first tracks each including a lower and an upper horizontal track section and an inclined track section interconnecting the lower and upper track sections in an angular relationship thereto, a second pair of elongated tracks mounted to opposed sides of the conveyor section in generally the same horizontal plane as the lower track sections of the first tracks, a trolley movable vertically and horizontally to engage and push the load off one end of the conveyor section, the trolley including first and second carriages, each carriage having at least one roller for engaging the first tracks and at least one head supported by the carriages in parallel relationship to the transverse axes of the load-carrying rollers for engaging the load, the trolley having a first position wherein the head is below the horizontal plane of the load-carrying rollers to allow movement of the load over the trolley on the rollers and a second position wherein the head is above the horizontal plane of the load-carrying rollers to engage the load, a pair of guide members movable both vertically and horizontally to move the trolley from its first position to its second position and vice versa in a generally constant parallel relationship to the horizontal plane of the load-carrying rollers, each of the guide members including a guide bar for engaging one of the second tracks and a lift guide plate for engaging one of the first and second carriages of the trolley, each of the lift guide plates including an elongated slot in an angular relationship to the lower horizontal track sections of the first tracks which is opposed to the angular relationship of the inclined track sections relative thereto, each of the carriages including posts slidably engaging the slots of the lift guide plates to allow level vertical movement of the entire trolley relative to the guide members, means for propelling the guide members to horizontally move the trolley in the longitudinal direction of the conveyor section and vertically move it from its first position to its second position and vice versa, and means for connecting the guide members to the propelling means, the connecting means including means for adjusting the orientation of the head relative to the load and means for adjusting the tension of the propelling means.

* * * * *

UNITED STATES PATENT AND TRADEMARK OFFICE
CERTIFICATE OF CORRECTION

PATENT NO. : 4,334,607
DATED : June 15, 1982
INVENTOR(S) : Thomas A. Dyer

It is certified that error appears in the above-identified patent and that said Letters Patent are hereby corrected as shown below:

Before the Abstract, Item [73], change "Pentak" to --Pentek--.

Signed and Sealed this

Tenth Day of August 1982

[SEAL]

Attest:

GERALD J. MOSSINGHOFF

Attesting Officer

Commissioner of Patents and Trademarks